United States Patent
Mortier et al.

(10) Patent No.: US 9,862,648 B2
(45) Date of Patent: Jan. 9, 2018

(54) TRANSPARENT METAL FLUORIDE CERAMIC

(71) Applicants: PARIS SCIENCES ET LETTRES—QUARTIER LATIN, Paris (FR); CENTRE NATIONAL DE LA RECHERCHE SCIENTIFIQUE (CNRS), Paris (FR); UNIVERSITE PIERRE ET MARIE CURIE (PARIS 6), Paris (FR)

(72) Inventors: Michel Mortier, Paris (FR); Pierre Aballea, Alfortville (FR); Patrick Gredin, Aulnay Sous Bois (FR); Akiko Suganuma, Paris (FR)

(73) Assignees: PARIS SCIENCES ET LETTRES—QUARTIER LATIN, Paris (FR); CENTRE NATIONAL DE LA RECHERCHE SCIENTIFIQUE (CNRS), Paris (FR); UNIVERSITY PIERRE ET MARIE CURIE (PARIS 6), Paris (FR)

( * ) Notice: Subject to any disclaimer, the term of this patent is extended or adjusted under 35 U.S.C. 154(b) by 0 days.

(21) Appl. No.: 15/301,597

(22) PCT Filed: Apr. 3, 2015

(86) PCT No.: PCT/EP2015/097008
§ 371 (c)(1),
(2) Date: Oct. 3, 2016

(87) PCT Pub. No.: WO2015/150584
PCT Pub. Date: Oct. 8, 2015

(65) Prior Publication Data
US 2017/0015591 A1  Jan. 19, 2017

(30) Foreign Application Priority Data
Apr. 4, 2014 (EP) ..................... 14305495

(51) Int. Cl.
*C04B 35/515* (2006.01)
*C04B 35/553* (2006.01)
(Continued)

(52) U.S. Cl.
CPC ........ *C04B 35/553* (2013.01); *C04B 35/6263* (2013.01); *C04B 35/6264* (2013.01);
(Continued)

(58) Field of Classification Search
CPC .. C04B 35/553; C04B 35/515; C04B 41/5055
See application file for complete search history.

(56) References Cited

U.S. PATENT DOCUMENTS 4,043,803 A * 8/1977 Skaria ............... C01F 11/22
                                                423/158
6,723,139 B1 * 4/2004 Biragnet ........... C01B 7/192
                                                23/304
(Continued)

FOREIGN PATENT DOCUMENTS

CN  102 674 843 A    9/2012
WO  2013/073592 A1   5/2013

OTHER PUBLICATIONS

Aubry et al. Synthesis and Optical Characterizations of Yb-Doped CaF2 Ceramics. Optical Materials 31(5):750-753 • Mar. 2009.*
(Continued)

*Primary Examiner* — Noah S Wiese
(74) *Attorney, Agent, or Firm* — Osha Liang LLP (57) ABSTRACT

A method for producing a metal fluoride ceramic, comprising: providing a sedimented compound comprising metal fluoride particles having an average particle size lower than 30 nm and a solvent, partially drying the sedimented compound at a temperature lower than 65° C. until the partially
(Continued)

dried compound comprises from 5 wt % to 45 wt % of the solvent, and sintering, for example in air, the partially dried and sedimented compound.

13 Claims, 10 Drawing Sheets

(51) Int. Cl.
 *C04B 35/626* (2006.01)
 *C04B 35/64* (2006.01)
(52) U.S. Cl.
 CPC .... *C04B 35/6266* (2013.01); *C04B 35/62615* (2013.01); *C04B 35/62655* (2013.01); *C04B 35/64* (2013.01); *C04B 2235/3201* (2013.01); *C04B 2235/3206* (2013.01); *C04B 2235/3208* (2013.01); *C04B 2235/3213* (2013.01); *C04B 2235/3215* (2013.01); *C04B 2235/3224* (2013.01); *C04B 2235/3225* (2013.01); *C04B 2235/3227* (2013.01); *C04B 2235/3241* (2013.01); *C04B 2235/3279* (2013.01); *C04B 2235/5454* (2013.01); *C04B 2235/5481* (2013.01); *C04B 2235/658* (2013.01); *C04B 2235/6562* (2013.01); *C04B 2235/6565* (2013.01); *C04B 2235/6567* (2013.01); *C04B 2235/668* (2013.01); *C04B 2235/77* (2013.01); *C04B 2235/781* (2013.01); *C04B 2235/784* (2013.01); *C04B 2235/785* (2013.01); *C04B 2235/9653* (2013.01)

(56) References Cited

U.S. PATENT DOCUMENTS

2010/0323878 A1   12/2010   Ishizawa
2014/0239228 A1*   8/2014   Ishizawa ............... C01F 11/22
                                                    252/301.4 S

OTHER PUBLICATIONS

International Search Report and Written Opinon of the International Searching Authority issued in corresponding International Application No. PCT/EP2015/097008, dated Jul. 10, 2015 (8 pages).
Michel Mortier et al.; "Last advances in Yb3+ doped CaF2 ceramics synthesis"; Solid State Lasers XX: Technology and Devices; vol. 7912, No. 1; pp. 1-9; Feb. 10, 2011 (9 pages).
P. Aubry et al.; "Synthesis and optical characterizations of Yb-doped CaF2 ceramics"; Optical Materials, Elsevier Publishers; vol. 31, No. 5; pp. 750-753; Jun. 9, 2008 (4 pages).
Gang Lu et al.; "Fabrication and properties of highly transparent Nd-doped CaF2 ceramics"; Material Letters, Elsevier Publishers; vol. 115; pp. 162-164; Oct. 24, 2013 (3 pages).
S.E. Hatch et al.; "Hot-Pressed Polycrystalline CaF2:Dy2+ Laser"; Applied Physics Letters; vol. 5, No. 8; pp. 153-154; Oct. 15, 1964 (2 pages).
Akio Ikesue et al.; "Fabrication and Optical Properties of High-Performance Polycrystalline Nd: YAG Ceramics for Solid-State Lasers"; Journal of the American Ceramic Society; vol. 78, No. 4; p. 1033; 1995 (8 pages).
Jianren Lu et al.; "Neodymium doped yttrium aluminum garnet (Y3Al5O12) nanocrystalline ceramics—a new generation of solid state laser and optical materials"; Journal of Alloys and Compounds; vol. 341; pp. 220-225; 2002 (6 pages).
Y. Rabinovitch et al.; "Transparent polycrystalline neodymium doped YAG: synthesis parameters, laser efficiency"; Optical Materials; vol. 24; pp. 345-351; 2003 (7 pages).
M.Sh. Akchurin et al.; "CaF2:Yb laser ceramics"; Optical Materials; vol. 35; pp. 444-450; 2013 (7 pages).
Andréas Lyberis et al.; "Effect of Yb3+ concentration on optical properties of Yb:CaF2 transparent ceramics"; Optical Materials; vol. 34; pp. 965-968; 2012 (4 pages).
Akira Shirakawa et al.; "Yb3+-doped CaF2-LaF3 Ceramic Laser"; Advanced Solid-State Lasers Congress Postdeadline Papers; vol. JTh5A7; 2013 (3 pages).
International Search Report issued in PCT/EP2015/097008, dated Jul. 10, 2015 (3 pages).
Written Opinion of the International Searching Authority issued in PCT/EP2015/097008, dated Jul. 10, 2015 (7 pages).

* cited by examiner

| Grain N° | Line N° | Grain size (nm) | Grain N° | Line N° | Grain size (nm) | Grain N° | Line N° | Grain size (nm) |
|---|---|---|---|---|---|---|---|---|
| 1 | 1 | 180 | 21 | 2 | 90 | 41 | 3 | 50 |
| 2 | 1 | 90 | 22 | 2 | 130 | 42 | 4 | 110 |
| 3 | 1 | 220 | 23 | 2 | 130 | 43 | 4 | 110 |
| 4 | 1 | 160 | 24 | 2 | 60 | 44 | 4 | 110 |
| 5 | 1 | 190 | 25 | 2 | 180 | 45 | 4 | 250 |
| 6 | 1 | 70 | 26 | 2 | 260 | 46 | 4 | 150 |
| 7 | 1 | 90 | 27 | 2 | 140 | 47 | 4 | 180 |
| 8 | 1 | 160 | 28 | 3 | 110 | 48 | 4 | 370 |
| 9 | 1 | 250 | 29 | 3 | 150 | 49 | 4 | 230 |
| 10 | 1 | 150 | 30 | 3 | 120 | 50 | 4 | 250 |
| 11 | 1 | 190 | 31 | 3 | 150 | 51 | 4 | 100 |
| 12 | 1 | 250 | 32 | 3 | 130 | 52 | 4 | 160 |
| 13 | 1 | 120 | 33 | 3 | 100 | 53 | 4 | 250 |
| 14 | 1 | 110 | 34 | 3 | 210 | 54 | 4 | 100 |
| 15 | 1 | 130 | 35 | 3 | 130 | 55 | 4 | 90 |
| 16 | 1 | 80 | 36 | 3 | 320 | 56 | 4 | 190 |
| 17 | 1 | 310 | 37 | 3 | 110 | 57 | 4 | 250 |
| 18 | 2 | 190 | 38 | 3 | 190 | 58 | 4 | 80 |
| 19 | 2 | 230 | 39 | 3 | 80 | | | |
| 20 | 2 | 50 | 40 | 3 | 140 | | | |

TRANSPARENT METAL FLUORIDE CERAMIC

TECHNICAL FIELD

The present disclosure relates to a metal fluoride ceramic, to a method for producing the same, and to an optical device comprising the same. More specifically, the present disclosure relates to a method for producing a transparent metal fluoride ceramic.

In the present description and in the following claims, the term "transparent material" is intended to indicate a material which is transparent in a predetermined wavelength region of the electromagnetic spectrum, which may be a wavelength region of interest or of reference. For example, a ceramic having an absorbance lower than 0.05 $cm^{-1}$ at 1200 nm and lower than 1 $cm^{-1}$ at 370 nm may be a transparent ceramic. It is understood that a transparency measurement of a doped ceramic is to be performed at a wavelength at which there is no absorption/emission of the dopant.

In the present description and in the following claims, the term "ceramic" is intended to indicate a polycrystalline inorganic solid prepared by action of heat, e.g. sintering, and subsequent cooling.

In the present description and in the following claims, the term "sintering" refers to a technique, based on atomic diffusion, which may be used to prepare ceramics from particles.

BACKGROUND

Laser, such as for example solid state lasers, use man-made doped monocrystals, i.e. single crystals, and glasses as active laser media. Single crystals and glasses may be selected to be transparent in a predetermined wavelength region of the electromagnetic spectrum. In addition, single crystals exhibit good thermal conductivity, while glasses can be formed in any shape and size.

However, the known active laser media and the method for producing the same suffer from a number of disadvantages. On one side, glasses have a poor thermal conductivity, thereby limiting the average power of the lasers using glasses as active media. For example, glasses used as active laser media within mega joule lasers limit their use to an operation at a few pulses per day, typically 3 or 4 pulses per day.

On the other side, the known methods for producing single crystals are very slow, tedious and expensive. For example, the known methods for producing doped single crystals involve macroscopic segregation of a dopant during the growth process of the single crystals in a liquid-solid equilibrium. As a consequence, not only the maximum concentration of a dopant within a single crystal is limited, but also any doped single crystal obtained by such a method exhibits a dopant concentration gradient. In addition, the step of melting the material requires the use of expensive high temperature equipments (e.g. platinum, iridium crucibles), which may pollute the single crystals.

A further disadvantage of single crystals is that, at a macroscopic level, in order to produce large single crystals, the crystal growth is slow, e.g. 10-100 µm per hour during fusion of the materials, e.g. at a temperature of 1000° C.-2500° C. Consequently, days are required to grow single crystals. At a microscopic level, the crystal growth is fast, when compared to natural crystals. Consequently, the quality of a man-made single crystal remains poor due to the presence of a large amount of crystal defects. Consequently, only a middle portion of a single crystal is usable as active laser medium, the head and the tail of the single crystal as well as the remaining liquid phase being discarded. In a typical case, about 30% of the material may be lost in the crucible during crystal growth, and less than 50% of the resulting single crystal is considered to be usable as active laser medium.

A further disadvantage is that birefringence effects may be observed using a single crystal as active laser medium, thereby depolarizing the laser beam.

Further, single crystals are quite fragile. For example, single crystals have a limited thermomechanical resistance and fracture strength. Therefore, cracks within a monocrystalline structure can easily propagate.

Not only single crystal growth techniques are complex and energy intensive, but also the optical homogeneity of a single crystal is limited. As a result, wavefront propagation distortion remains and ever occurring problem.

The use of transparent ceramics as active laser media has been described by Hatch, Parsons and Weagley (*Appl. Phys. Lett.* 5(8) (1964) 153-154). According to these authors, transparent ceramics may have properties approaching the properties of single crystals. However, the method used for producing these ceramics has still a number of disadvantages. For example, the method is very energy-intensive as it comprises subsequent steps of vacuum hot-pressing and annealing. In addition, the method requires the synthesis of single crystals. Also, the obtained materials exhibit poor transparency and high level of optical loss in short wavelengths in the visible domain.

As of today, the most studied ceramic materials having potential laser application are oxide based transparent ceramics. For example, an yttrium aluminum garnet (YAG) ceramic was reported in 1995 by Ikesue et al. (*J. Am. Ceram. Soc.* 78(4) (1995) 1033). However, the known oxide based ceramics are synthesized through a tedious method under extreme conditions, in terms of temperature, which may exceed 1650° C. Typical synthetic methods described by Ikesue et al. require the production of $Y_3Al_5O_{12}$ to occur during a high temperature sintering step by reaction of alumina ($Al_2O_3$) with yttrium oxide ($Y_2O_3$). More specifically, a stable aqueous suspension comprising a mixture of $Al_2O_3$, $Y_2O_3$, and adjuvants (deflocculants, binding agents and pH modifiers) is first obtained by slow, mild and long stirring (12 h) using a ball milling apparatus. This milled slurry is then spray dried to obtain highly compact polycrystalline aggregates having an average size in the micron range such as lower than 150 microns. These aggregates are then cold isostatically pressed (CIP) (98-200 MPa) to constitute a "green body", i.e. an unsintered ceramic material, before debinding and calcinating under air to remove the adjuvants. The resulting material is then sintered for 20 hours at 1750° C. under high vacuum. After the sintering step, additional steps of hot isostatic pressing (HIP) and annealing are then performed to improve density and remove electronic defaults induced during the high vacuum sintering, respectively. Since this initial article, it is worth noting that the group of Ikesue has managed to bypass the spray drying step by directly casting or casting under pressure the milled slurry using a porous mould.

Another exemplary method for providing YAG ceramics has been provided by Konoshima Chemical Co., Ltd (*Journal of Alloys and Compounds* 341 (2002) 220-225). The method consists of preparing a YAG phase through calcination at 1200° C. of a precursor gel. First, a mixture of powders is provided. Then, a slurry is prepared by adding solvents, deflocculants, binding agents and pH modifiers to the powders, and ball milling the resulting mixture for 24 h. This mixture is then cast into a porous mould (typically gypsum) to obtain a "green body". After a further drying step, the resulting material is removed from the mold, calcinated under high temperature, and then sintered under high vacuum for 20 hours at 1750° C. After the sintering, additional steps of hot isostatic pressing (HIP) and annealing are performed to remove electronic defaults induced during the sintering under high vacuum. Another exemplary method for providing YAG ceramics has been provided by Rabinovitch et al. (*Optical Materials* 24 (2003) 345-351), the method described being quite similar to the ones described by Ikesue et al. and Konoshima Chemical Co., Ltd.

While the transparency window of known oxide based ceramics remains generally quite narrow, fluoride based ceramics may have a certain transparency within a larger range from 190 nm to 7 μm. Furthermore, metal fluoride ceramics may exhibit thermal conductivity comparable to the thermal conductivity of single crystals. In addition, metal fluoride ceramics may possess improved hardness, breaking strength and thermal shock properties. Further, metal fluoride ceramics may be produced in any shape and size. Also, methods for producing metal fluoride ceramics require shorter times and lower temperatures than those required in single crystal growth processes. However, the transparency of metal fluoride ceramics is insufficient for laser applications because no practical method for producing fluoride based ceramics having optical properties meeting the requirements of active laser media has yet been described. Indeed, since the work of Hatch, Parsons and Weagley, methods for producing transparent metal fluoride ceramics for laser applications have been quite unsuccessful because most metal fluoride ceramics have an unacceptable amount of optical defects, e.g. defects localized in grain boundaries or pores, defects due to dopant segregation or grain scale heterogeneity, etc. These defects render the known metal fluoride ceramics unsuitable as active laser media.

As a first example, Basiev et al. (*Optical Materials* 35 (2013) 444-450) describe the use of single crystals for the synthesis of $CaF_2$:Yb ceramics obtained by uniaxial hot pressing or hot-forming dry materials under vacuum. Although lasing results were observed, optical defects were still present such as $Yb^{2+}$ impurities. In addition, the methods proposed by these authors still require high-energy input and preparation of single crystals to merely provide ceramics having a layered structure.

As a second example, a preparation of fluoride based ceramics has been described by one of the inventors of the present application (*Optical Materials* 34 (2012) 965-962). However, the method described therein requires the use of dried powders, which are then annealed, pressed and sintered under vacuum. The obtained ceramic must then be post-treated by uniaxial hot pressing to obtain transparency. In addition, optical defects were still present and thus no slope efficiency results were observed.

As a further example, a method for providing $CaF_2$:Yb,La ceramics has been described by Nikon Corporation (Advanced Solid-State Lasers Congress Postdeadline Papers, OSA 2013, JTh5A7) with somehow decent results but with at least two major inconvenients. First, the method implies codoping with optically inactive $La^{3+}$ ions, thereby reducing the thermal conductivity of the ceramic. Second, the method requires a standard sintering step including pressing and sintering dry powders. In addition, the use of $LaF_3$ involves the substitution of $Yb^{3+}$ ions by $La^{3+}$ ions, which alters the structure of $Yb_6F_{37}$ hexameric clusters, thereby producing optical defects and insufficient optical properties.

As a further example, a method for providing Nd-doped $CaF_2$ ceramics has been described by Gang Lu et al. (*Materials Letters* 115 (2014) 162-164). The method described involves uniaxial hot-pressing under vacuum (900° C., 30 MPa) of dry particles obtained by coprecipitation. However, the resulting ceramic is of poor quality and has a limited transparency.

In view of the above, standard methods for providing metal fluoride ceramics involve a main step comprising the pressing of a dry powder prior to the sintering. However, the pressing of a dry powder generates formation of aggregates, especially when the powder has an average particle size in the nanometric range. As a result, during the sintering, the presence of aggregates generates differential sintering which is a source of porosity and thus of poor transparency. Furthermore, not only the sintering step must be performed under constraints, but also additional post-sintering steps under constraints are also typically required.

Accordingly, there exists a continuing need to develop improved active laser media and methods for producing the same.

SUMMARY

An object of the present disclosure is to provide a transparent metal fluoride ceramic which may be used, particularly but not exclusively, as an active laser medium. Another object of the present disclosure is to provide an optical device comprising said transparent metal fluoride ceramic. Still another object of the present disclosure is to provide a method for producing a metal fluoride ceramic which can be performed under mild conditions and in a limited number of steps. A further object of the present disclosure is to provide a wet chemical route for producing a metal fluoride ceramic.

According to a first aspect, the above-mentioned objects, as well as further advantages, are achieved by a method for producing a metal fluoride ceramic comprising: providing a sedimented compound comprising metal fluoride particles having an average particle size lower than about 30 nm and at least one solvent, partially drying the sedimented compound at a temperature lower than about 65° C. until the partially dried and sedimented compound comprises a predetermined amount of solvent, for example from 5 wt % to 45 wt % of solvent, and sintering the partially dried and sedimented compound. For example, the partial drying may be performed at a temperature ranging from about 5° C. to about 60° C. In this way, during the sintering, cracks may not form and/or propagate within the polycrystalline structure of the metal fluoride ceramic.

In the present description and following claims, drying refers to removing the solvent and partial drying refers to a partial removal of the solvent. In the present description and following claims, sedimented compound refers to a compound comprising at least a solvent and metal fluoride particles which have settle out of the solvent(s) and have come to rest, e.g. at the bottom of a container.

Advantageously, in order to obtain a transparent metal fluoride ceramic, no intermediate step is necessary between the step of sintering and the step of partial drying.

In some embodiments, providing a sedimented compound comprises: centrifuging the metal fluoride particles in the solvent, and removing the supernate.

In some embodiments, the sintering is performed under vacuum or air under atmospheric pressure.

In some embodiments, the sedimented compound, before being subjected to the partial drying, comprises a predetermined initial content of solvent, for example, a maximum of about 65 wt % of solvent, preferably from about 55 wt % to about 65 wt % of solvent, for example about 60 wt % of solvent or less.

In some embodiments, the metal fluoride particles have a standard deviation of the particle size lower than about 25 nm. In this way, inhomogeneous sintering may be avoided and formation of low density zones within the metal fluoride ceramic is avoided.

In some embodiments, the metal fluoride particles are selected from the group comprising $MF_2$, $AMF_3$, $ABF_4$ and $AB_3F_{10}$, wherein A is an alkali metal, B is a rare earth metal and M is an alkaline earth metal.

In some embodiments, A selected from the group comprising potassium, sodium, cesium and rubidium, B is selected from the group comprising yttrium and lanthanides, and M is selected from the group comprising calcium, magnesium, barium and strontium.

In some embodiments, M is calcium.

In some embodiments, the metal fluoride particles further comprise at least one dopant.

In some embodiments, the dopant is selected from the group comprising transition metals and rare earth metals.

In some embodiments, the metal fluoride particles are ytterbium (III) doped calcium fluoride particles.

In some embodiments, the sintering is performed at a temperature ranging from about 500° C. to about 750° C.

In some embodiments, the sedimented compound comprises water and metal fluoride particles obtained by a method comprising a mechanochemical or a soft chemistry processing.

For example, if the metal fluoride particles are obtained by a soft chemistry processing, providing a sedimented compound may comprise: providing a mixture of a solvent and of metal fluoride particles, and centrifuging the mixture for about 40 min or more, and removing the supernate.

According to a second aspect, one or more of the above-mentioned objects may be achieved by a metal fluoride ceramic having an average grain size lower than 450 nm and having an absorbance lower than 0.05 $cm^{-1}$ at 1200 nm and lower than 1 $cm^{-1}$ at 370 nm.

The metal fluoride ceramic may be for example obtained by one or more of the above-mentioned embodiments of the method for producing a metal fluoride ceramic.

According to a third aspect thereof, the present disclosure further relates to an optical device comprising the above-mentioned metal fluoride ceramic or a metal fluoride ceramic produced by one or more of the embodiments of the above-mentioned method.

According to a fourth aspect, the above-mentioned objects, as well as further advantages, are achieved by a method for producing a metal fluoride ceramic comprising: directly sintering a green body provided by sedimentation of a colloidal solution of metal fluoride nanoparticles, which are preferably non-stabilized. Directly sintering indicates the absence of further steps between the steps of providing and sintering the green body. In some embodiments, the solution of non-stabilized fluoride nanoparticles doesn't contain anything other than these particles and the solvent. In some embodiments, the concentration of the metal fluoride nanoparticles ranges from about 1 weight % to about 40 weight % of the colloidal solution, for example from about 10 weight % to about 30 weight %; for example the concentration of the metal fluoride nanoparticles may be of about 20 weight %. In some embodiments, the solvent of the colloidal solution is partially removed, for example, by centrifuge sendimentation. In some embodiments, the sintering is performed at a temperature ranging from about 500° C. to about 750° C. In some embodiments, the sintering is performed at a temperature ranging from about 520° C. to about 700° C. In some embodiments, the metal fluoride nanoparticles have an average particle size lower than about 30 nm. In some embodiments, the metal fluoride ceramic as a density higher than 99%, when directly determined by Archimedes principle. The Archimede principle relies on the measure of the weight of the solid in air and in the water.

DETAILED DESCRIPTION OF EMBODIMENTS

Embodiments disclosed herein relate generally to providing transparent metal fluoride ceramics. More specifically, embodiments, disclosed herein relate to methods for providing transparent metal fluoride ceramics.

Embodiments of the present disclosure will now be described in detail with reference to the accompanying figures. In the following detailed description of embodiments of the present disclosure, numerous specific details are set forth in order to provide a more thorough understanding of the present disclosure. However, it will be apparent to one of ordinary skill in the art that the present disclosure may be practiced without these specific details. In other instances, well-known features have not been described in detail to avoid unnecessarily complicating the description.

Herein, the words "comprise/comprising" are synonymous with (means the same thing as) "include/including," "contain/containing", are inclusive or open-ended and do not exclude additional, unrecited elements. Further, herein the term "about" and "substantially" are synonymous with (means the same thing as) a 20% margin of the respective value.

As described in the background section, the use of a single crystal or a glass as active laser medium remains limited. In addition, the known methods for providing transparent ceramics are highly energy intensive. Furthermore, known methods for producing a metal fluoride ceramic merely provide ceramics having an unacceptable amount of optical defects, which are therefore unsuitable for lasing applications. More specifically, all standard methods for producing metal fluoride ceramics require the sintering of a dry material in order not to involve any interaction with solvents during any step involving high temperature heating. For example, the reactivity and the hygroscopic character of numerous fluoride materials are known to generate formation of oxyfluorides and even oxides in presence of solvents such as water, methanol, ethanol or acetone. In the same manner, presence of fluorocarbons and chlorofluorocarbons may also generate side products. Thus, the prior art clearly and unambiguously teaches away from using solvents, especially water, in high temperature treatments of fluoride containing compounds so as to avoid pyrohydrolysis.

Accordingly, there is provided a highly energy efficient method, which is simple, and which may be performed under mild conditions. The method requires less steps and energy consumption compared to standard methods. Further, the method provides metal fluoride ceramics having a low amount of optical defects and having transparency characteristics suitable, particularly but not exclusively, for lasing applications.

According to the method of the present disclosure, the molding of a wet "green body" (hereby below referred as the "sedimented compound") prior to a step of sintering neither requires the pressing of a dry powder, nor the additional steps of molding, drying, annealing, debinding, calcinating of an optionally adjuvant stabilized slurry. Rather, the method of the present disclosure comprises the preparation of a "green body" (here below referred as the "partially dried sedimented compound") without adding any particular adjuvant; and the sintering of the partially dried sedimented compound without the requirement of additional steps. Indeed, in opposition to the methods for the preparation of metal fluoride ceramics according to the prior art, the compound according to the present disclosure is not required to be dried, but only to be sedimented and partially dried. Furthermore, the compound according to the present disclosure is not required to be stabilized by any adjuvant, such as a deflocculant, a binding agent or a pH modifier, to obtain a partially dried sedimented compound configured to be sintered. In other words, unlike conventional methods, the method according to the present disclosure comprises: 1/ providing a sedimented compound comprising metal fluoride particles and at least one solvent, the compound neither requiring to be stabilized by adjuvants, nor requiring to contain a high weight % of metal fluoride particles; 2/ partially drying the sedimented compound; and 3/ sintering the partially dried and sedimented compound.

Advantageously, according to the method of the present disclosure, the metal fluoride particles are therefore sedimented without formation of aggregates, which are known to be source of porosity and thus of poor transparency of the final ceramic. Furthermore, there is no requirement of using a porous mold as in known methods.

According to the present disclosure, a metal fluoride ceramic suitable for lasing application may be obtained by providing a sedimented compound comprising metal fluoride particles and at least one solvent and by partially drying, at a temperature lower than 65° C., such a sedimented compound until the partially dried and sedimented compound comprises a predetermined amount of solvent, and sintering the partially dried and sedimented compound.

Advantageously, the method of the present disclosure provides highly isotropic metal fluoride ceramics comprising a pure single phase of homogeneous composition having high thermal conductivity and transparency characteristics.

Furthermore, sintering may be performed under milder conditions with respect to the conditions required by vacuum sintering, and moreover hot pressing, for example when compared to the temperatures, vacuum or inert atmosphere required by a hot pressing. Furthermore, sintering may be performed under milder conditions with respect to the conditions required by Hot Isostatic Pressing (HIP) treatment, for example when compared to the pressures, temperatures and inert atmosphere According to one or more embodiments, drying is partial and thus, once the drying is stopped, the sedimented compound comprises a predetermined amount of solvent lower than the initial amount of solvent. For example, the sedimented compound comprising metal fluoride particles and a solvent may comprise about 65 wt % of solvent or less, preferably from about 55 wt % to about 65 wt % of solvent, for example about 60 wt % of solvent or less. For example, partial drying may be stopped when the percentage of solvent within the partially dried and sedimented compound is reduced to not more than about 45 wt %, for example less than about 45 wt %, and for example between about 45 wt % and about 5 wt % of solvent. In this way, during the sintering, cracks may not form and/or propagate within the polycrystalline structure of the metal fluoride ceramic.

According to one or more embodiments, the solvent may be selected from the group comprising: water, methanol, ethanol, water and methanol, water and ethanol, acetone, fluorocarbons and chlorofluorocarbons. Preferably, the fluorocarbons and the chlorofluorocarbons have melting point greater than 20° C. and boiling point between 50 and 200° C., for example about 100° C. For example, the chlorofluorocarbon may be a Freon such as tetrachloro-1,2-difluoroethane or tetrachloro-1,1-difluoroethane; the fluorocarbon may be a perfluorinated solvent such as perfluoro-2-n-butyl THF.

According to one or more embodiments of the method of the present disclosure, sintering may be performed under air or vacuum. According to one or more embodiments of the method of the present disclosure, sintering may be performed under atmospheric pressure. According to one or more embodiments, the sintering may be performed without any mechanical constraint.

According to one or more embodiments, sintering may be performed at a temperature of about 500° C. to about 750° C., preferably from about 520° C. to about 700° C., and more preferably from about 540° C. to about 550° C. According to one or more embodiments, sintering may be performed during a predetermined period of time, for example lower than 1 hour, for example from about 1 min to about 5 hours, preferably from about 1 min to about 1 hour, and more preferably from about 1 min to about 30 min.

The partial drying is performed at a mild temperature, such as at a temperature lower than 65° C. Advantageously, in this way, not only partial drying is performed at mild conditions, but it is also possible to keep metal fluoride particles having a substantially constant average particle size without any growth. In addition, the metal fluoride particles do not agglomerate and cracks do not form. According to one or more embodiments, the partial drying is performed at a temperature ranging from about 5° C. to about 60° C., for example from about 15° C. to about 35° C., and for example at room temperature, i.e. at about 20-25° C.

According to one or more embodiments, for example when the solvent does not consist of water, the partially drying may be performed at a temperature substantially lower than or equal to 30° C. below the boiling temperature of the solvent.

According to one or more embodiments, the partial drying is performed under atmospheric pressure. According to one or more embodiments, the partial drying is performed under air with a predetermined percentage of moisture, which may range from about 30% to about 85%, for example from about 45% to about 65%.

According to one or more embodiments, the partial drying is performed for over 80 hours, for example for over 100 hours, for example from about 125 to about 400 hours, and for example from about 150 to about 300 hours. In this manner, the partial drying may be performed, for example, by simply disposing the sedimented compound in an open container and by setting the container aside for a few days at room temperature (e.g. 20-25° C.).

The sedimented compound comprising metal fluoride particles and a solvent according to the present disclosure may be obtained by providing a mixture of a solvent and of metal fluoride particles, by centrifuging said mixture for about 40 min or more, for example for about 1 hour or more, for example for about 90 min or more, and for example for about 2 hours, and by partially removing the supernate. Advantageously, the centrifuging provides sufficient compacting so that the sedimented compound is directly ready for partial drying.

Advantageously, using the step of centrifuging, hot-pressing is not required during the sintering. Furthermore, in this way, no step of annealing is required between the partial drying and the sintering.

According to one or more embodiments, the step of sintering is performed directly after the partial drying, no intermediate step being provided between the step of sintering and the step of partial drying.

According to one or more embodiments, centrifuging is performed at a frequency higher than about 10000 rpm, for example at about 13000 rpm. According to one or more embodiments, the temperature of the mixture may be set at a predetermined value during the centrifuging. For example, the temperature of the mixture may be set at room temperature or less, for example at a temperature lower than 25° C., for example lower than 20° C., for example lower than 10° C., and for example at about 4° C.

According to one or more embodiments, the metal fluoride particles of the sedimented compound prior to partial drying may be nanoparticles. For example, the metal fluoride particles of the sedimented compound prior to partial drying may have an average particle size lower than about 30 nm, for example ranging from about 5 nm to about 25 nm, for example from about 10 nm to about 20 nm. The average size of the particles can be measured by X-rays powder diffraction, for example. The X-rays powder diffraction involves a method described in the paper: Physical Review Letters 56 (1939), 978-982. The particle average size obtained from the X-ray diffraction pattern, is measured from the broadening of the peaks, and is reliable up to 80 nm. Size distribution of particles is obtained from transmission electron microscopy (TEM) images, such as obtained on a 200 kV Jeol 2200FS microscope, and then standard deviation is deduced. According to one or more embodiments, the standard deviation of the particle size of the metal fluoride particles of the sedimented compound prior to partial drying may be lower than about 25 nm, for example lower than about 20 nm, and for example lower than about 15 nm.

Figure 2A:
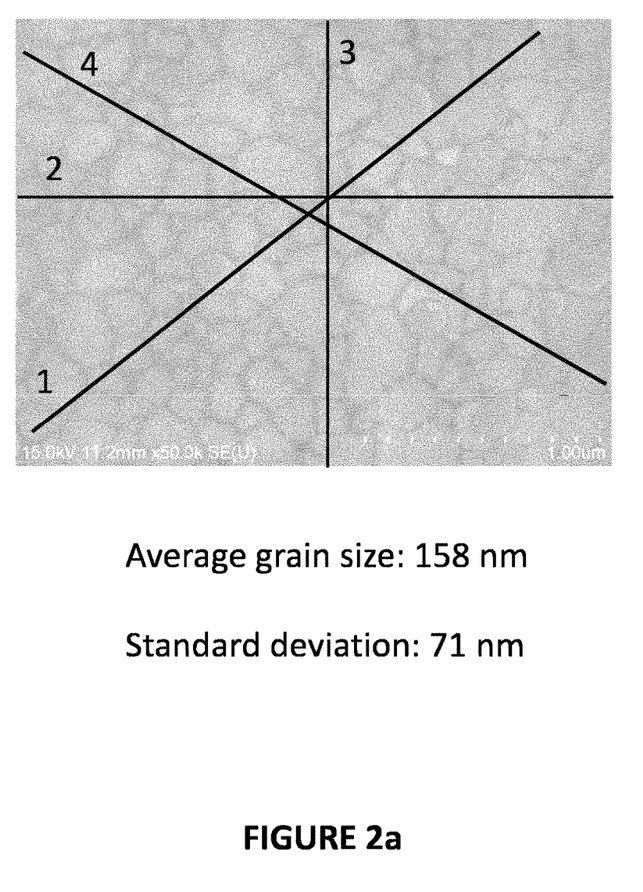
Figure 2B:
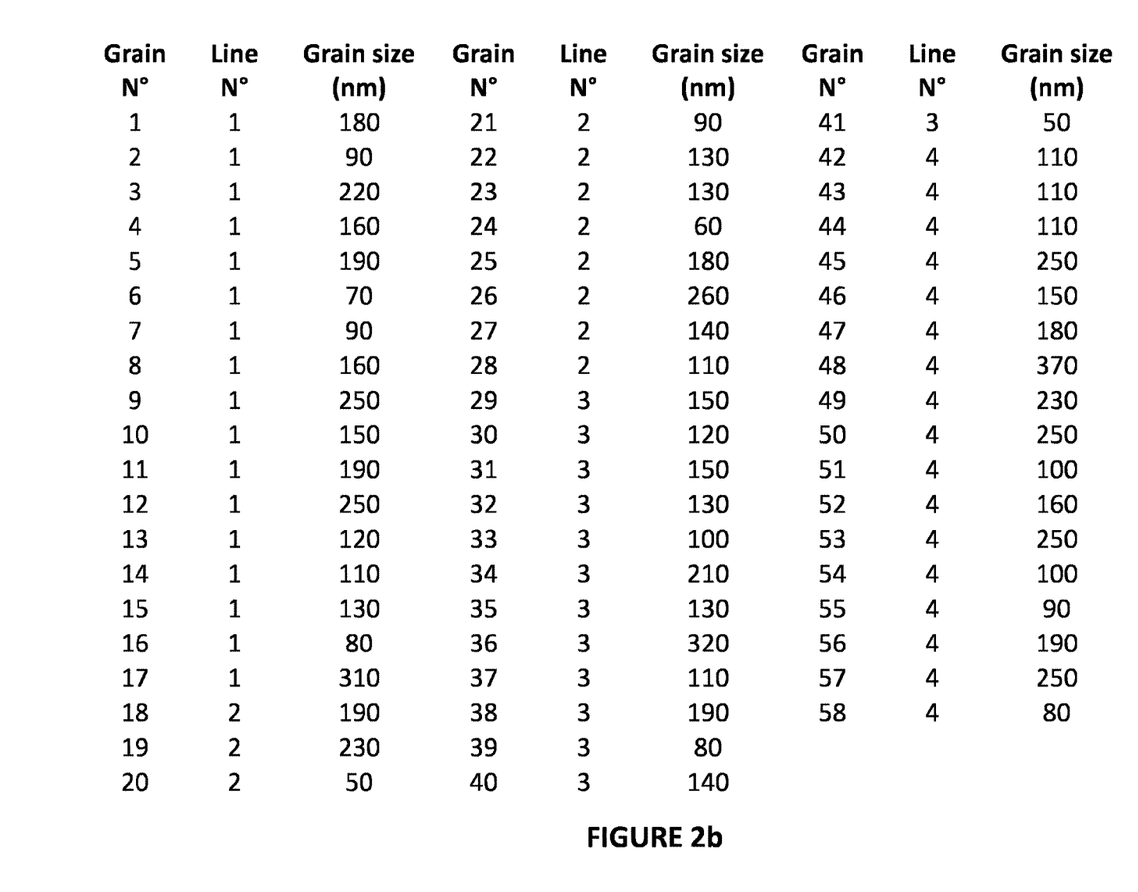

The average grain size and the standard deviation of the grain size of a metal fluoride ceramic according to the present disclosure may be determined, for example, by scanning electron microscopy (SEM) such as on a (Scanning Electron Microscope-Field Emission Gun: SEM-FEG) Hitachi SU-70. For example, the average grain size of a metal fluoride ceramic may be calculated by a method comprising summation of the lengths of a plurality of grains measured in a plurality of lines of an electron microscopy image, divided by the number of grains, as shown in FIGS. 2a and 2b. The standard deviation is mathematically calculated from the data gathered from the SEM measurements.

The metal fluoride particles used in the present method may be obtained through various techniques. For example, techniques which may be used may comprise grinding metal fluoride materials or powders such as grinding metal fluoride particles having an average particle size higher than about 100 nm, or single crystals having the same composition as the metal fluoride particles. According to one or more embodiments, the metal fluoride particles are obtained by mechanochemical processing such as the processing described by one of the inventors of the present application (J. solid State Chem. 179 (2006) 2636-2644). According to one or more embodiments, the metal fluoride particles are obtained by soft chemistry processing. According to one or more embodiments, the metal fluoride particles thereby obtained may be subjected to a size separation processing such as by centrifugation of a solid-liquid mixture. In this way, the metal fluoride particles having a larger size are discarded, e.g. metal fluoride particles having an average particles size higher than about 30 nm and/or having a standard deviation of the particle size higher than about 25 nm.

As metal fluoride particles, ytterbium (III) doped calcium fluoride particles (i.e. $CaF_2:Yb^{+3}$) may be used. However, the method of the present disclosure also applies to other metal fluoride particles. For example, the metal fluoride particles may be selected from the group comprising $MF_2$, $AMF_3$, $ABF_4$, $AB_3F_{10}$ and a solid solution of $MF_2$-$M'F_2$, wherein A is an alkali metal, B is a rare earth metal and M and M' are an alkaline earth metal. For example, A may be selected from the group comprising potassium, sodium, cesium and rubidium. For example, B may be selected from the group comprising yttrium and lanthanides. For example, M and M' may be selected from the group comprising calcium, magnesium, barium and strontium. In some embodiment, the sedimented compound consists of: 1/ fluoride particles of at least one metal, the particles having an average particle size lower than 30 nm, 2/ at least one solvent, and 3/ optionally at least one dopant.

According to one or more embodiments, the metal fluoride particles may be single crystals and may have, for example, a cubic crystal structure (e.g. $CaF_2$). However, according to one or more embodiments, the metal fluoride particles may have a symmetry lower than that of a cubic crystal structure.

Furthermore, the method of the present disclosure may be applied to metal fluoride particles which may be doped or undoped. If the metal fluoride particles are doped, according to one or more embodiments, the dopant may selected from the group comprising transition metals and rare earth metals. For example, the dopant may be selected from the group comprising $Y^{3+}$, $La^{3+}$, $Nd^{3+}$, $Dy^{2+}$, $Er^{3+}$, $Yb^{3+}$, $Ni^{2+}$ and $Cr^{3+}$, for example $Yb^{3+}$. According to one or more embodiments, the dopant may be an active dopant such as $Yb^{3+}$ or any other dopant having absorption/emission characteristics in a wavelength region of interest. According to one or more embodiments, the dopant may be a non active dopant such as $Y^{3+}$ or any other dopant having no absorption/emission characteristics in a wavelength region of interest. In this way, the method for producing metal fluoride ceramics not only provides absorbing/emitting metal fluoride ceramics suitable for lasing applications, but also non absorbing/emitting materials with thermal conductivity and transparency characteristics suitable for the manufacturing of, for example, thermal conductive products and the like. According to one or more embodiments, the metal fluoride particles comprise from about 0 mol % (undoped) to about 20 mol % of dopant, preferably from about 0.5 mol % to about 10 mol % of dopant.

According to this embodiment, an example of soft chemistry processing, such as the processing as described by one of the inventors of the present application (*J. solid State Chem.* 179 (2006) 2636-2644), may be used. For example, according to one or more embodiments, the mixture of the solvent and of the metal fluoride particles may be provided by preparing a first solution comprising at least a first solvated metal, preparing a second solution comprising hydrofluoric acid, and mixing the first solution and the second solution, thereby providing the mixture of the solvent and of the metal fluoride particles. For example, a precursor of the first solvated metal may be added to the first solution, and the first solution may be stirred until dissolution of the precursor.

According to one or more embodiments, the first and/or the second solutions may comprise water. According to one or more embodiments, the precursor may comprise a calcium and/or a nitrate compound, such as calcium nitrate. According to one or more embodiments, mixing the first solution and the second solution may comprise stirring the second solution and adding the first solution to the second solution, for example drop by drop. According to one or more embodiments, the adding the calcium and/or nitrate compound to the first solution may further comprise adding at least one dopant to the first solution, and stirring the first solution until dissolution of the at least one dopant. When at least one dopant is used, the at least one dopant may comprise at least one transition metal compound and/or at least one rare earth metal compound and/or at least one nitrate compound, for example Yb (III) nitrate.

According to one or more embodiments, centrifuging the mixture and partial removing the supernate may be performed more than once, for example a plurality of times, for example at least 2 or 3 times. So, for example, the method may comprise a first centrifuging, a first removing, and then a second centrifuging, a second removing, etc. According to one or more embodiments, the centrifuging is performed during a predetermined period of time, for example lower than 1 hour, for example for about 10-40 min, for example for about 20-35 min to provide the sedimented compound. According to one or more embodiments, the first centrifuging is performed for a shorter period of time compared to any of the additional, i.e. $2^{nd}$, $3^{rd}$, etc. . . . , centrifuging(s).

According to one or more embodiments, the method further comprises washing the metal fluoride particles with a solvent, such as for example water, after a step of removing and before a further step of centrifuging. According to one or more embodiments, centrifuging, removing and washing are performed 2-5 times or more, for example 6 times or more, for example 7 times. According to one or more embodiments, the method ends with a final centrifuging and a final removing. So, for example, the method may comprise a first centrifuging, a first removing, and a first washing, and then a second centrifuging, a second removing, a second washing, etc. up to a final centrifuging and a final removing.

According to one or more embodiments, a method comprising a mechanochemical processing may be used. According to this embodiment, the mixture of the solvent and of the metal fluoride particles may be provided, for example, by first grinding, such as ball milling (for example using a zirconia pot with zirconia balls), metal fluoride powder(s) (e.g. commercial powder(s)) to obtain metal fluoride particles; and second adding a solvent, e.g. water, to the metal fluoride particles after the grinding. According to one or more embodiments, powder(s) of at least one dopant fluoride (e.g. a commercial $YbF_3$ powder) may be added to the metal fluoride powder(s) (e.g. a commercial $CaF_2$ powder). For example, a planetary high energy ball mill may be used, e.g. at 600 rpm, to grind the powders into metal fluoride particles. According to one or more embodiments, grinding is performed over 10 hours, for example over 15 hours, for example 17 hours. According to one ore embodiments, grinding may be performed under air or under an inert atmosphere, such as for example argon. Further, according to one or more embodiments, the metal fluoride particles thereby obtained by a method comprising a mechanochemical processing may be subjected to a further step of size separation processing in order to remove metal fluoride particles having a size larger than 100 nm.

Using the method of the present disclosure, metal fluoride ceramics having a small average grain size and having a high transparency may be obtained in simple manner and under mild conditions. For example, the metal fluoride ceramics of the present disclosure may have an absorbance lower than 0.05 $cm^{-1}$ at 1200 nm and lower than 1 $cm^{-1}$ at 370 nm. For example, the average grain size may be lower than 450 nm. According to one or more embodiments, the average grain size may range from about 50 nm to about 400 nm, for example from about 100 nm to about 300 nm, for example about 180 nm.

According to one or more embodiments, the standard deviation of the grain size of the metal fluoride ceramics according to the present disclosure may be lower than about 250 nm, for example lower than about 200 nm, for example from about 150 nm to about 200 nm.

According to one or more embodiments, the metal fluoride ceramic, such as $CaF_2$, may be doped with a predetermined compound, such as a $Yb^{3+}$, having absorption and emission characteristics in the wavelength region of interest where the undoped metal fluoride ceramic is transparent. In this way, excellent lasing characteristics of the doped metal fluoride ceramic may be obtained.

EXAMPLES

Preparation of a Mixture of Solvent and Metal Fluoride Particles 2N calcium nitrate tetrahydrate (Sigma-Aldrich), 3N ytterbium (III) nitrate pentahydrate (Alfa Aesar), 48% fluorohydric acid (Prolabo), and 18.2MΩ ultra HQ permuted water were used. A first solution was prepared by adding 14.9 g of $Ca(NO_3)_2$, $4H_2O$ and 1.49 g of $Yb(NO_3)_3$, $5H_2O$ to 20 mL of water in a 75 mL beaker (i.e. 5% doping). After stirring for about 2 minutes, i.e. after dissolution of the starting materials, the first solution was added, drop by drop, to a second solution of 48% hydrofluoric acid (20 mL) prepared in a 200 mL teflon beaker. In this example, the addition was performed under air at about 1 mL/min while stirring the second solution. The resulting coprecipitation reaction provided a mixture of a precipitate of 3.5 g of $CaF_2$:$Yb^{3+}$ particles having an average particle size of 15 nm and an aqueous solvent comprising nitric acid side product.

Centrifuging

Following a first 13000 rpm centrifugation of the mixture performed at 4° C. for 20 minutes, the supernate was discarded, 25 mL of water was added the particles were dispersed by mixing in a turbula mixer (Willy A. Bachofen AG Maschinenfabrik) until the particles detached from the side of the centrifuge tube and dispersed into the solution (visual control, 1 to 3 hours). Further, the steps of centrifuging the mixture, removing the supernate and washing the particles with water were performed 6 times. Lastly, a final 13000 rpm centrifugation of the mixture was performed at 4° C. for 2 hours, thereby providing a sedimented compound comprising $CaF_2$:$Yb^{3+}$ particles.

Partial Drying

The partial drying of the sedimented compound comprising $CaF_2$:$Yb^{3+}$ particles was performed by evaporation of the water from the centrifuge tube at room temperature (e.g. 25° C.) and under air with a percentage of moisture of about 60%. After visually controlling that the sedimented compound was translucent and detached from the side of the centrifuge tube, the partial drying was stopped. This partial drying was performed for 5 to 6 days.

Sintering

Figure 1:
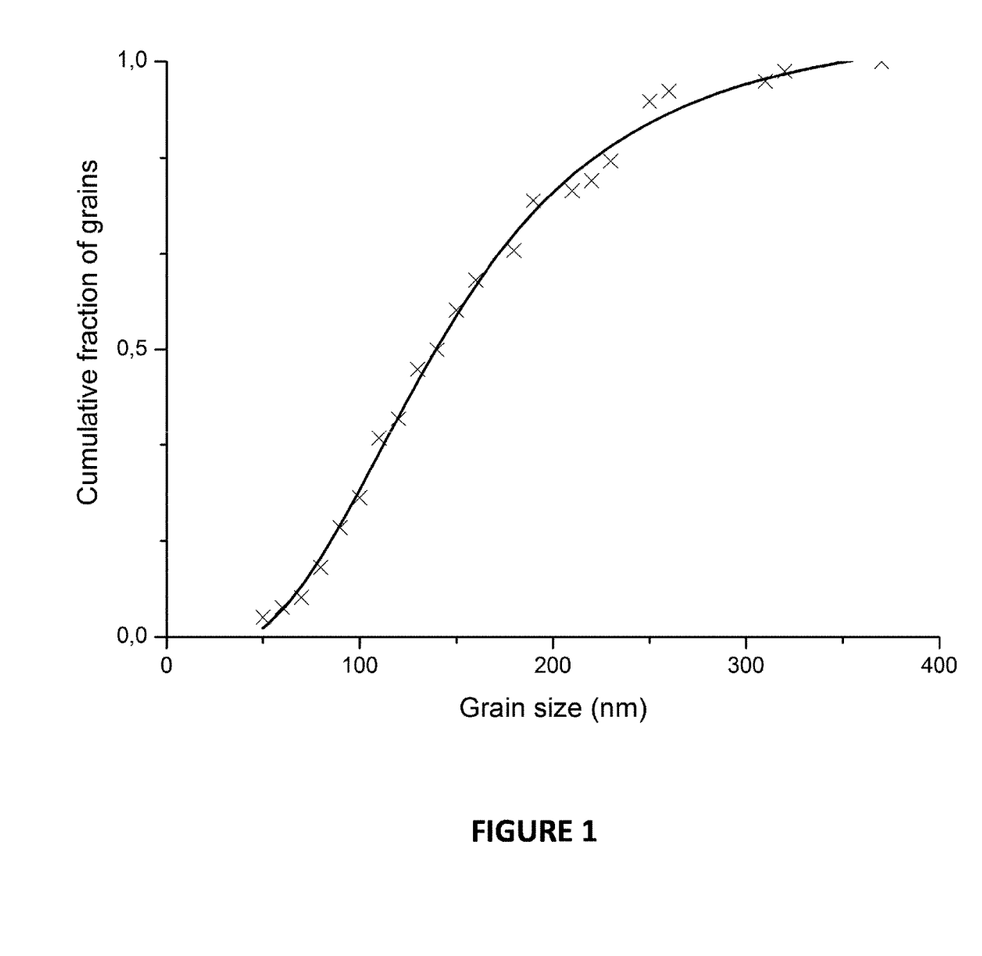
FIGS. 1, 2a and 2b show distribution and measurement of the grain size of a metal fluoride ceramic according to an embodiment of the present disclosure.

The partially dried and sedimented compound was immersed in commercial $CaF_2$ powder (2N, Sigma-Aldrich), for example, in a platinum crucible. Further, the crucible was disposed at room temperature in an oven (Meker) under air. The temperature of the oven was then heated to 600° C. at a rate of 10° C./min. After 5 min at 600° C., the oven was then cooled down to 500° C. at a rate of 20° C./min. Finally, the oven was cooled down to room temperature at a rate of about 4° C./min, thereby providing a transparent ytterbium (III) doped (5%) calcium fluoride ceramic (i.e. $CaF_2$:5% $Yb^{3+}$) having an average grain size of 158 nm as shown in FIGS. 1 and 2 (standard deviation of the grain size of 71 nm).

Lasing Tests

Figure 3:
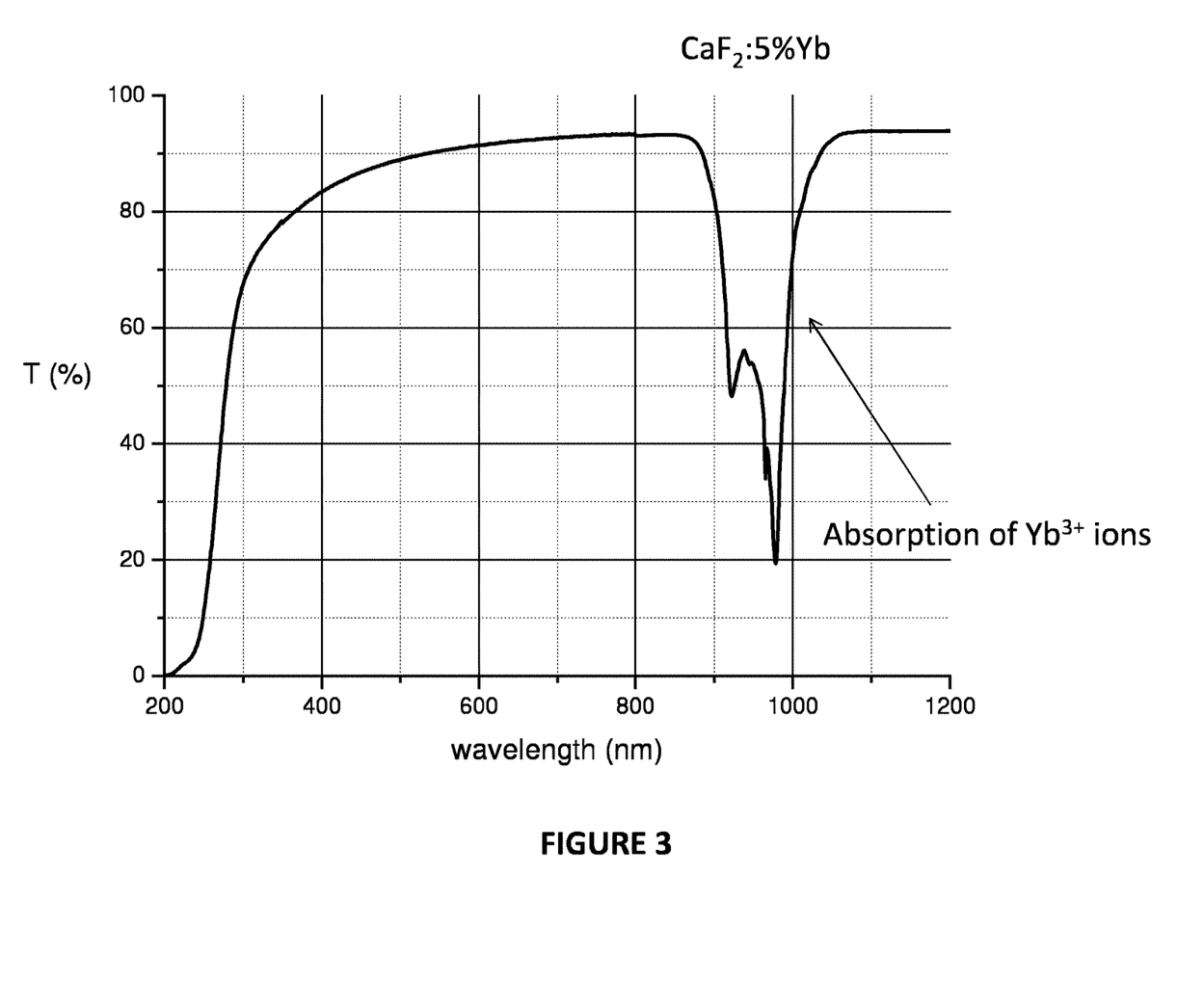
FIG. 3 shows absorption spectra of a metal fluoride ceramic according to an embodiment of the present disclosure.
Figure 4:
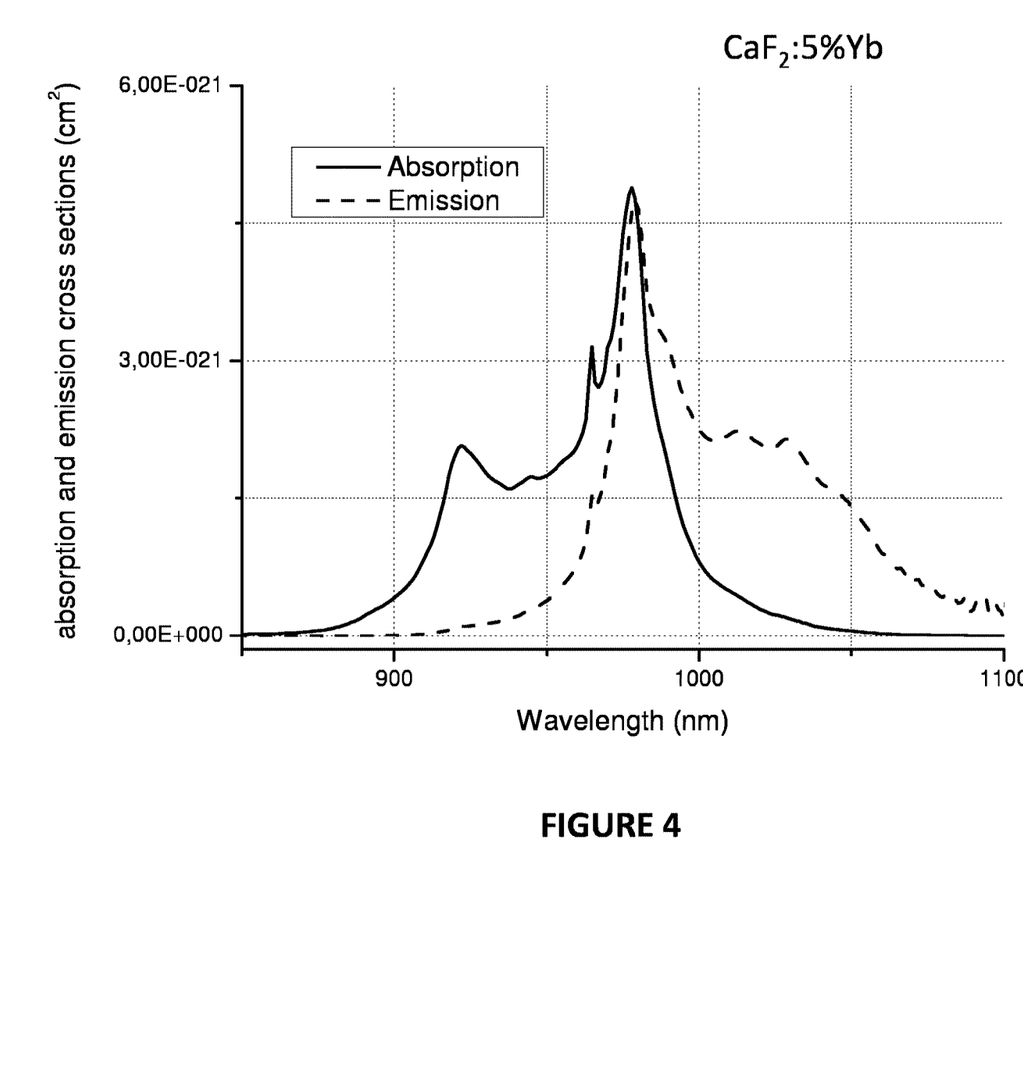
FIG. 4 shows the absorption and emission cross section spectra of a metal fluoride ceramic according to an embodiment of the present disclosure.

After sintering, the resulting ytterbium (III) doped calcium fluoride ceramic was then polished, thereby providing a transparent $CaF_2$:5% $Yb^{3+}$ ceramic having a thickness of 2.81 mm (Yb doping level: 4.7 mol %). As shown in FIG. 3, this ceramic was highly transparent. Indeed, besides the typical absorption bands of $Yb^{3+}$ ions, the transmittance was found to be over 90% in the visible and near Infrared ranges, i.e. from about 500 nm to 1200 nm. FIG. 4 shows absorption (continuous line) and emission (dotted line) cross section spectra of the $CaF_2$:5% $Yb^{3+}$ ceramic.

Figure 5:
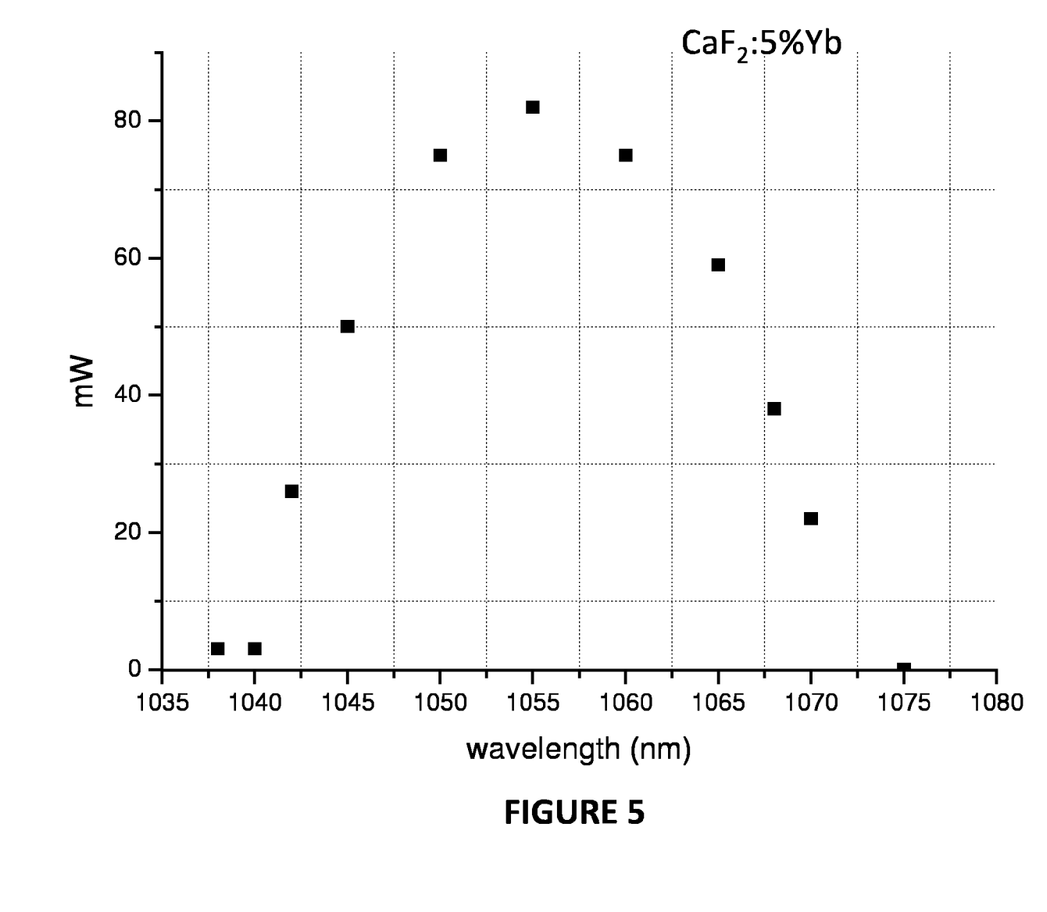
FIG. 5 shows the laser tunability of a metal fluoride ceramic according to an embodiment of the present disclosure.
Figure 6:
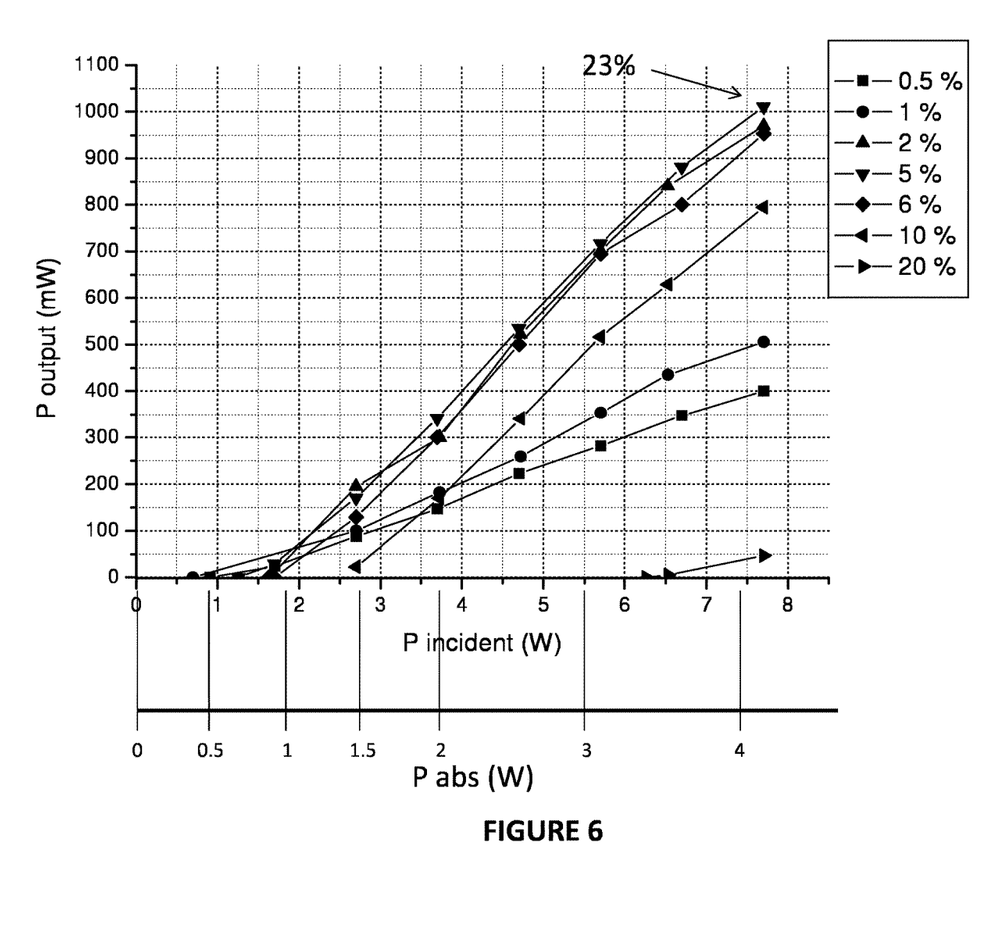
FIGS. 6 and 7 show input-output characteristics of a laser using a metal fluoride ceramic as laser active medium according to an embodiment of the present disclosure.
Figure 7:
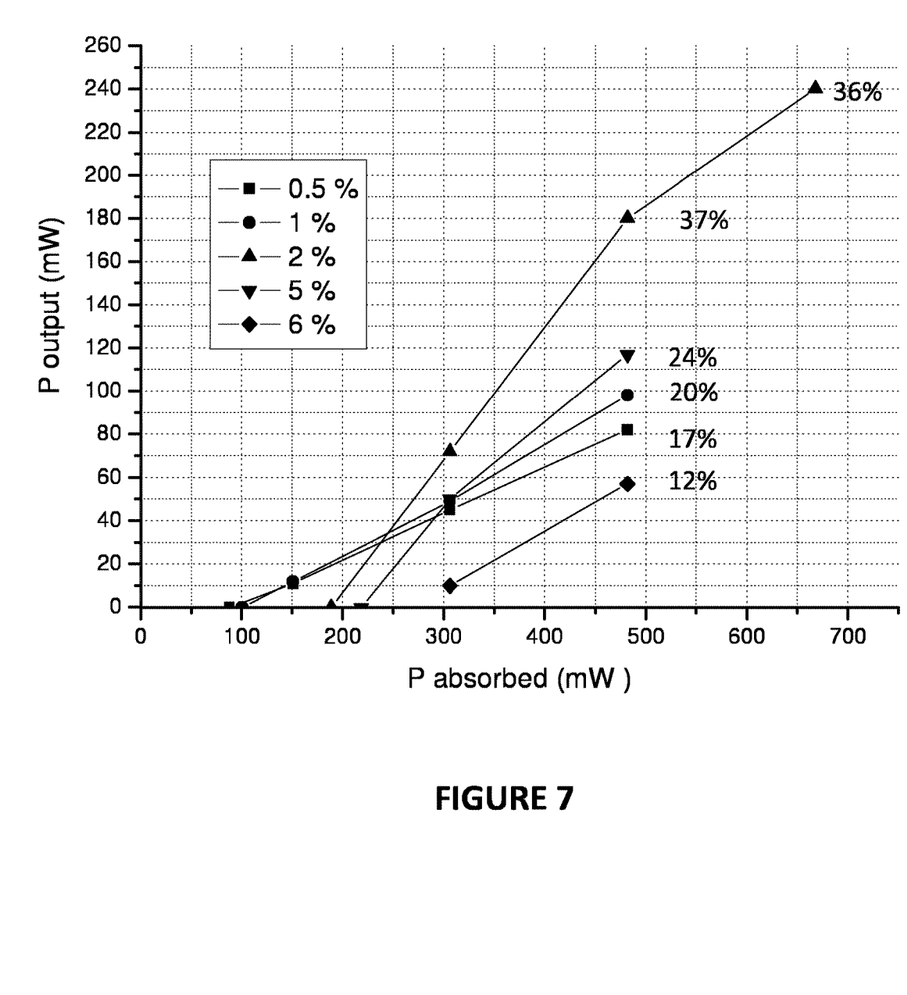

According to FIG. 5, this type of ceramic may be used for example by lasers emitting between 1035 nm and 1075 nm whether they are pulsed or not. For example, $CaF_2$:5% $Yb^{3+}$ as active laser medium may provide a maximum slope efficiency of 23% using a chopped diode laser by pumping at 975 nm (see FIG. 6). In this case, the best results were obtained with a coupling percentage of 5%. In the same manner, $CaF_2$:5% $Yb^{3+}$ as active laser medium may provide a maximum slope efficiency of 36% using a Ti:sapphir laser by pumping at 979.3 nm (see FIG. 7). In this case, the best results were obtained with a coupling percentage of 2%.

Figure 8:
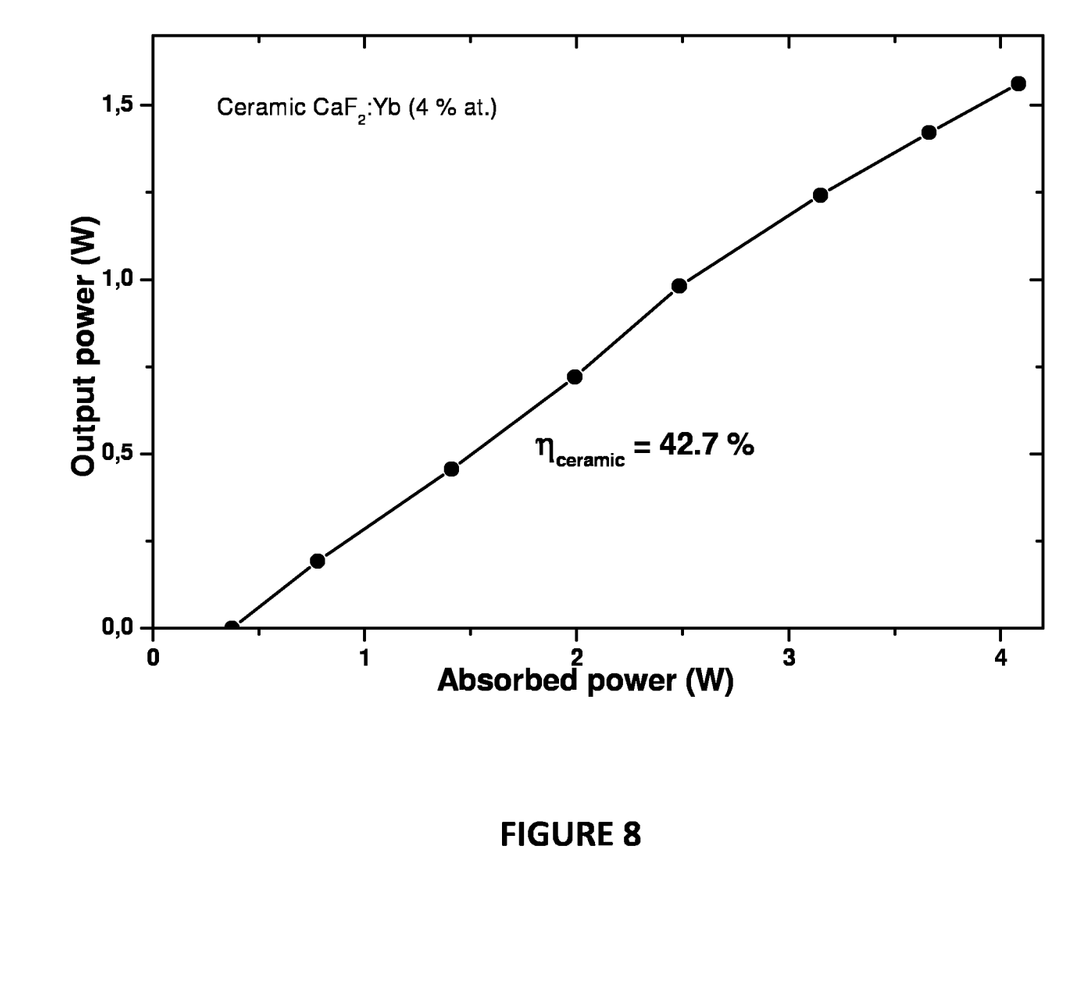
FIG. 8 shows input-output characteristics of a laser using a metal fluoride ceramic as laser active medium according to an embodiment of the present disclosure.
Figure 9:
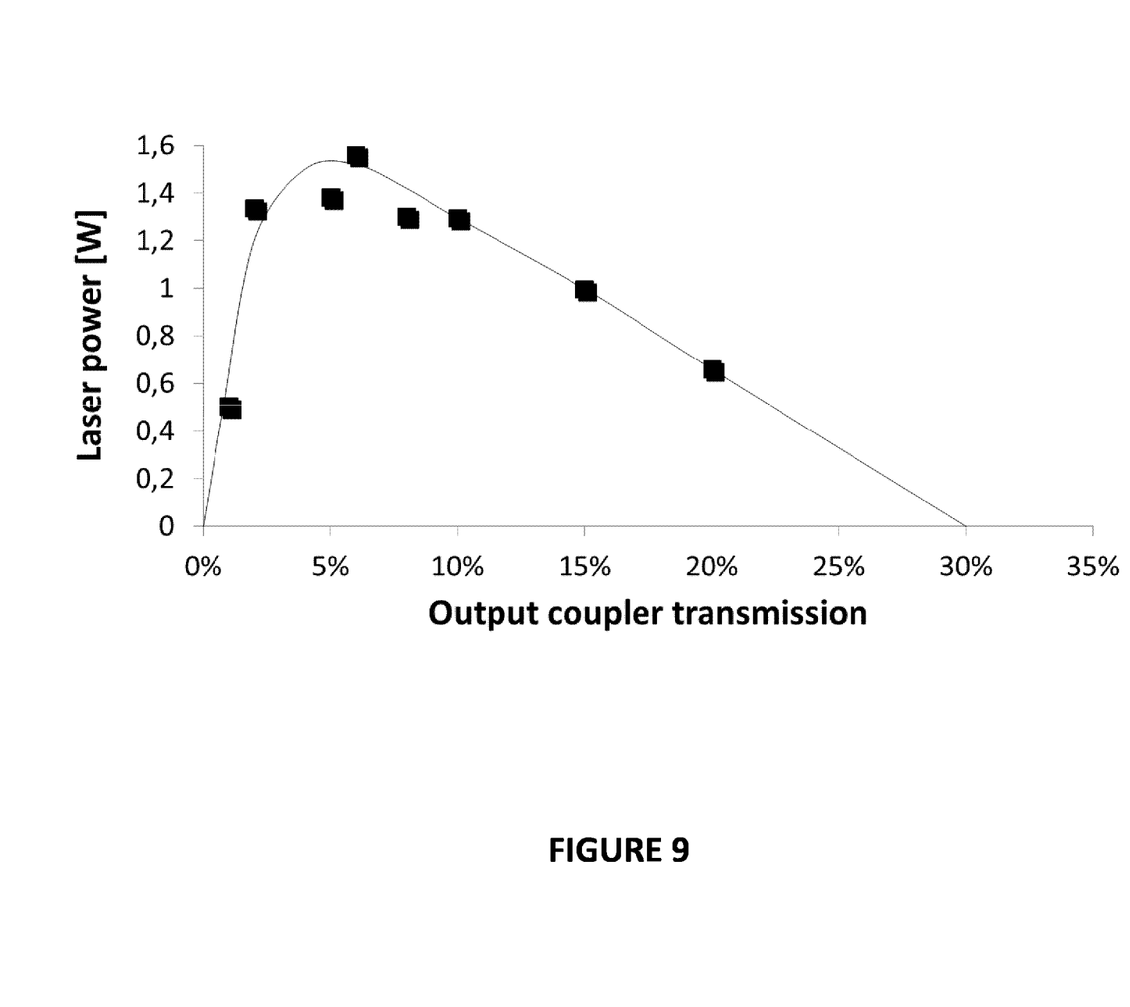
FIG. 9 shows coupling percentage-output power characteristics of a laser using a metal fluoride ceramic as laser active medium according to an embodiment of the present disclosure.

Another ytterbium (III) doped calcium fluoride ceramic prepared by the method according to the present disclosure was polished to provide a transparent $CaF_2$:4% $Yb^{3+}$ ceramic having a thickness of 2.71 mm. Said transparent $CaF_2$:4% $Yb^{3+}$ ceramic provided a maximum slope efficiency of 43% as active laser medium using a diode laser by pumping at 977 nm (see FIG. 8). In this case, the best results were obtained with a coupling percentage of 6% (see FIG. 9). A maximum of 1.6 W was extracted from the ceramic sample with an incident pump power of 7 W and an absorb power of 4 W.

Although the above-mentioned embodiments have been described in detail, it is understood that alternative embodiments of the disclosure can be envisaged. Thus, for example, any soft chemical or mechanochemical processing known to the man skilled in the art can be used to synthesize the metal fluoride particles according to the present disclosure. In addition, various compositions such as optionally doped ceramics of the type $MF_2$, $MF_2$-$M'F_2$, $AMF_3$, $ABF_4$ and $AB_3F_{10}$ can be envisaged to obtain lasing performances. The method of the present disclosure for the preparation of transparent metal fluoride ceramic is easy, efficient, environmentally friendly, and provides a new type of highly efficient active laser media.

The invention claimed is:

1. A method for producing a metal fluoride ceramic, comprising:
   providing a sedimented compound comprising metal fluoride particles having an average particle size lower than 30 nm and a solvent;
   partially drying the sedimented compound at a temperature lower than 65° C. until the partially dried compound comprises from 5 wt % to 45 wt % of the solvent; and
   sintering the partially dried and sedimented compound.

2. The method according to claim 1, wherein providing a sedimented compound comprises:
   centrifuging the metal fluoride particles in the solvent, and removing the supernate.

3. The method according to claim 1, wherein the sintering is performed under air and under atmospheric pressure.

4. The method according to claim 1, wherein the sedimented compound comprises about 60 wt % of solvent or less.

5. The method according to claim 1, wherein the metal fluoride particles have a standard deviation of the particle size lower than 25 nm.

6. The method according to claim 1, wherein the metal fluoride particles are selected from the group comprising MF2, AMF3, ABF4 and AB3F10, and a solid solution MF2-M'F2, wherein A is an alkali metal, B is a rare earth metal and M and M' are an alkaline earth metal.

7. The method according to claim 6, wherein A is selected from the group consisting of potassium, sodium, cesium and rubidium, B is selected from the group consisting of yttrium and lanthanides, and M and M' are selected from the group comprising calcium, magnesium, barium and strontium.

8. The method according to claim 7, wherein M is calcium.

9. The method according to claim 1, wherein the metal fluoride particles further comprise at least one dopant.

10. The method according to claim 9, wherein the dopant is selected from the group consisting of transition metals and rare earth metals.

11. The method according to claim 1, wherein the metal fluoride particles are ytterbium (III) doped calcium fluoride particles.

12. The method according claim 1, wherein the sintering is performed at a temperature ranging between 500° C. to 750° C.

13. The method according to claim 1, wherein providing a sedimented compound comprises:
   providing a mixture of a solvent and of metal fluoride particles, and
   centrifuging the mixture for about 40 min or more, and removing the supernate.

* * * * *